MULTISTATION PUSHBUTTON SWITCH ASSEMBLY WITH MASTER CONTROL MEANS FOR ALTERNATIVE PUSH-PUSH OR ONLY ONE SWITCH OPERABLE AT A TIME MODES OF ACTUATION

Original Filed April 20. 1970 2 Sheets-Sheet 1

Inventor
E. G. Hansen
By Glenn A. Buse
Attorney

Dec. 11, 1973 E. G. HANSEN Re. 27,836

MULTISTATION PUSHBUTTON SWITCH ASSEMBLY WITH MASTER CONTROL MEANS FOR ALTERNATIVE PUSH-PUSH OR ONLY ONE SWITCH OPERABLE AT A TIME MODES OF ACTUATION

Original Filed April 20. 1970 2 Sheets-Sheet 2

Inventor
E. G. Hansen
By Glenn A. Bush
Attorney

United States Patent Office

Re. 27,836
Reissued Dec. 11, 1973

27,836

MULTISTATION PUSHBUTTON SWITCH ASSEMBLY WITH MASTER CONTROL MEANS FOR ALTERNATIVE PUSH-PUSH OR ONLY ONE SWITCH OPERABLE AT A TIME MODES OF ACTUATION

Eric George Hansen, Milwaukee, Wis., assignor to Globe-Union Inc.

Original No. 3,646,283, dated Feb. 29, 1972, Ser. No. 29,858, Apr. 20, 1970. Application for reissue Dec. 4, 1972, Ser. No. 311,861
Int. Cl. H01h *9/26*
U.S. Cl. 200—5 EB 14 Claims

Matter enclosed in heavy brackets [ ] appears in the original patent but forms no part of this reissue specification; matter printed in italics indicates the additions made by reissue.

ABSTRACT OF THE DISCLOSURE

A multistation or ganged modular pushbutton switch assembly including a plurality of switch modules having a slider bar with a cam section and a push-push actuation mechanism thereon and separate latch bars cooperating with the cam sections so that some of the modules acting as operating modules can be controlled by master switch modules to have either a push-push action, momentary action or are interlocked so that one must be actuated to deactuate the other.

BACKGROUND OF THE INVENTION

(1) Field of the invention

This invention relates to electrical switches, and more particularly, to multistation or ganged, modular pushbutton switches for performing the switching of a plurality of circuits.

Multistation or ganged modular pushbutton switches have been developed for uses where a control of multiplicity of operations or control of a sequence of operations is desired. Switches of this type are particularly useful in automatic station selection mechanisms for radio and television, automatic coin-operated devices and household appliances, such as electric ranges, washing machines, etc. They are also frequently used in electrical equipment such as communication and instrument devices, computer and office equipment and other mechanical equipment employing multiple circuits for the control thereof.

Switches of this type commonly have either an interlocking mechanism whereby the actuation of one station releases a previously actuated station to the original deactuated position, a push-push mechanism whereby a slider bar is depressed to actuate and is also depressed to deactuate, or are of the momentary-type action. For some applications where the switch assembly is being used to control equipment with several modes of operation, such as in automotive test equipment, it is desirable to have a single pushbutton switch assembly wherein at least some of the switching modules are capable of operating with more than one of the above modes of actions at any chosen time. A pushbutton switch assembly including this capability is especially desirable where there is a restricted space available for the equipment control module. Of course, it is always desirable to provide apparatus of this type having a minimum of moving parts and simplified construction.

SUMMARY OF THE INVENTION

A primary object of this invention is to provide a simple and economical multistation or ganged modular pushbutton switch assembly having at least some of the switch modules capable of operating with more than one type of action.

Another object of the invention is to provide such a switch assembly wherein some of the switch modules can be controlled to operate either with a push-push action, with a momentary action, or are interlocked with at least one other module so that the slider bar of one must be depressed to disengage a previously depressed slider bar of another module.

Other objects and advantages of this invention will become apparent to those skilled in the art from the following description of the preferred embodiment, accompanying drawings and appended claims.

The multistation or ganged modular pushbutton switch assembly of this invention includes a plurality of switch modules, each having a slider bar with a cam section and a push-push actuation mechanism thereon, and at least one latch bar cooperating with said cam sections to provide the desired switching action. Master switches, also having cam sections, are actuated to control the operation of the latch bar. As the slider bar of the master switch switch is depressed, the cam section thereof coacts with the latch bar and positions it with respect to the cam sections of the operating switch modules so they engage the latch bars in a manner to obtain the desired switching action. In a preferred embodiment, two separate latch bars and two master switches are employed. When the two master switches are in the deactuated position, the operating modules operate with a push-push action. The cam sections and latch bars are arranged so that the actuation of one master switch interlocks operating modules requiring the depressing of one operating module slider bar to release one previously depressed and the actuation of the other master switch results in the operating modules operating with a momentary action.

DESCRIPTION OF THE PREFERRED EMBODIMENT

Figure 1:
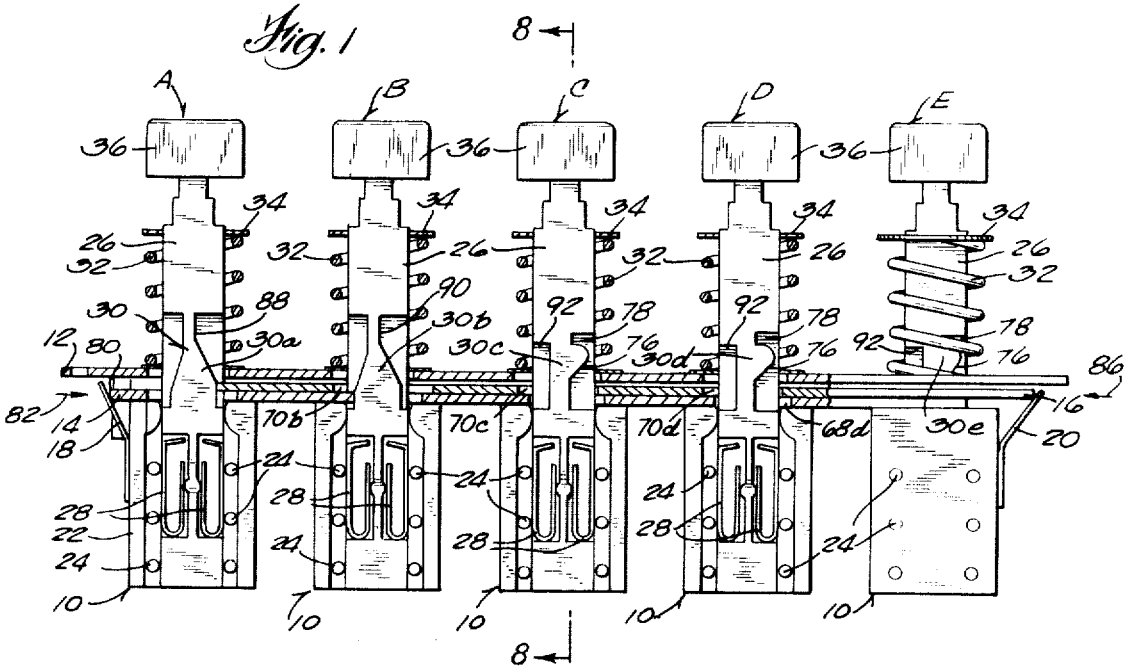
FIG. 1 is a plan view, partially broken away, of a ganged modular pushbutton switch exemplifying this invention.

Referring to the drawings, there is illustrated a pushbutton switch assembly having five switch modules. However, it should be understood that the number of modules can be increased or decreased. As shown in FIG. 1, the switch assembly includes a plurality of switch modules 10, generally designated A, B, C, D and E, mounted in spaced relationship on mounting bracket 12, latch bars 14 and 16, and bias springs 18 and 20 associated with latch bars 14 and 16, respectively. Switch modules A and B act as the master switches for controlling the type of action for the actuation of operating switch modules C, D and E. Each module 10 includes a stator block 22, made of electrically insulating material, which carries fixed contact terminals 24, slider bar 26 carrying movable contacts 28 which slide inside stator block 22 and a cam section 30 located on slider bar 26. Mounted on each silder bar 26, after the switch assembly has been assembled onto mounting bracket 12, are return spring 32, held in place by retaining clip 34. The basic construction of stator block 22, fixed contact terminals 24 and movable contacts 28, the interrelationship of these parts, and the operation thereof are conventional, being exemplified by U.S. Pat. No. 3,259,728, now exclusively licensed to the assignee of the present applicant. For purposes of brevity and completeness of the disclosure, the entire disclosure of that patent is incorporated herein. With the exception of cam sections 30, the differences between which will be described hereinafter, the various components of the master switch and operating switch modules are identical. Hence, in FIG. 1, the referenced numerals, therefore, are shown only for control module A for the sake of brevity.

Figure 6:
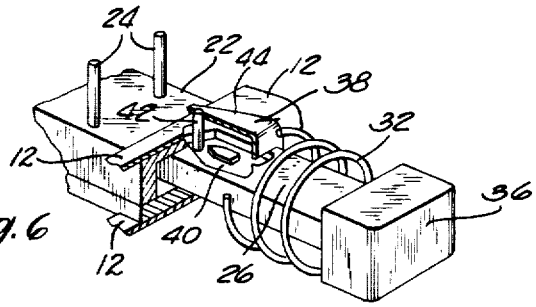
FIG. 6 is a perspective view, partially broken away, showing the push-push mechanism located on each slider bar.
Figure 7:
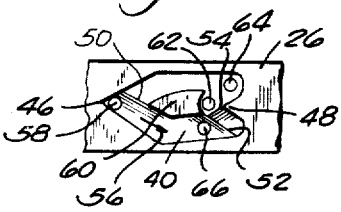
FIG. 7 is a plan view of the cam notch arrangement of the push-push mechanism shown in FIG. 6.

Located on the underside of each slider bar 26 is a push-push mechanism 38, shown in FIGS. 6 and 7. Push-push mechanism 38 is of conventional design. The construction operation of the exemplary push-push mechanism illustrated is fully described in U.S. Pat. No. [3,229,584] *3,229,548*, now exclusively licensed to the assignee of the present applicant. For the purposes of brevity and completeness of disclosure, the entire disclosure of that patent is also incorporated herein.

Only a summary of the construction and operation of the push-push mechanism will be described herein. Push-push mechanism 38 includes a hollow cam notch 40 and pivotable pin 42 which is held elastically against the bottom of cam notch 40 by leaf spring 44 attached to mounting bracket 12. As shown in FIG. 7, cam notch 40 has a closed contour with two points or peaks 46 and 48 and a variable depth forming several bevels and stops 50, 52 and 54. The bottom end of pin 42 is normally guided along this contour in the direction of arrow 56 as slider bar 26 reciprocates during depression and release. Slider bar 26 is in the deactuated position, the end of pin 42 is in position 58 in cam notch 40. For a normal push-push operation, slider bar 26 is depressed and the end of pin 42 is guided along the contour of cam notch 40 in the direction of arrow 56 over bevels 52 and 54, assuming position 62 when slider bar 26 is fully depressed. Slider bar 26 is held in the depressed or actuated position against the force of spring 32 by pin 42 engaging the notch portion of the central cam section 60 which is located opposite the point or peak 48 of the heart cam. When slider bar 26 is again depressed for deactuation, the end *of* pin 42 is prevented from returning backwards by bevel 54, and therefore, moves in the direction of arrow 56 or counterclockwise towards position 64. Slider bar 26 moves back under the biasing force of *spring* 32 and pin 42 follows the upper branch of cam notch 40 and lodges at the home position 58 in the depression formed by peak 46. Bevel 50 is sloped downwardly thereby preventing pin 42 from moving backwards or clockwise when slider bar 26 is again pressed. For alternate actions of the operating switch modules C, D and E described hereinafter, the movement of slider bar 26 is limited so that pin 42 does not proceed past position 66.

Figure 4:
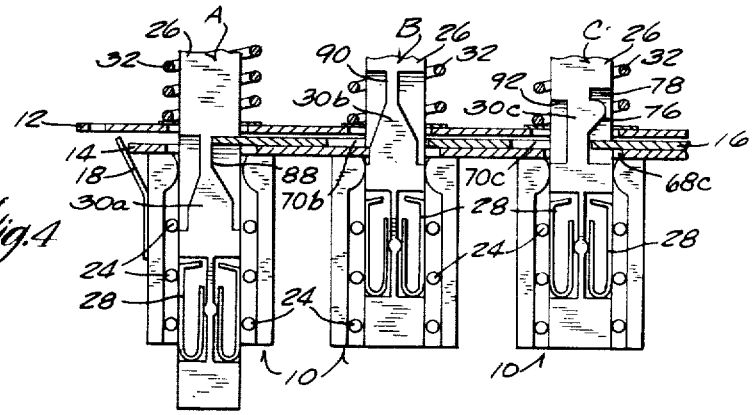
FIG. 4 is a partial plan view, partially broken away, of the switch assembly shown in FIG. 1 showing one of the master switches in the actuated position.
Figure 5:
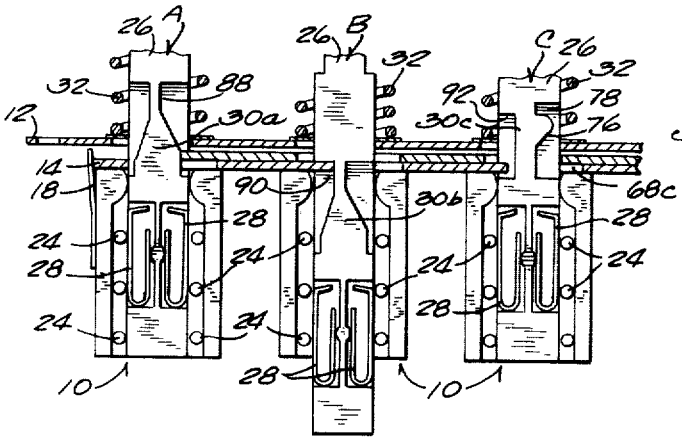
FIG. 5 is the same view as in FIG. 4 except the other master switch has been actuated.
Figure 2:
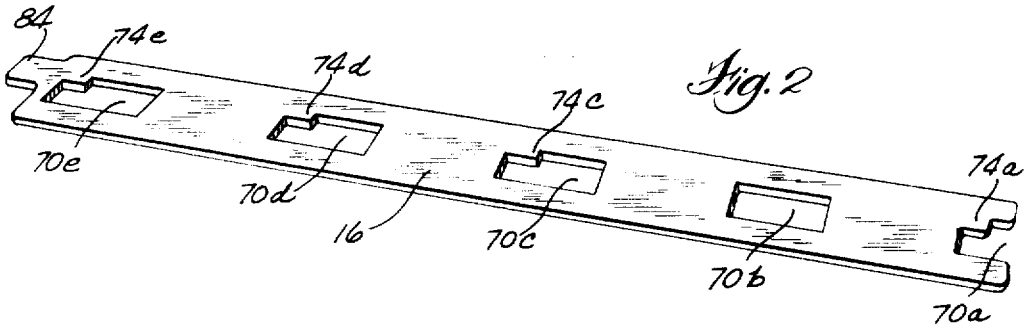
FIG. 2 is a perspective view of one of the latch bars.
Figure 3:
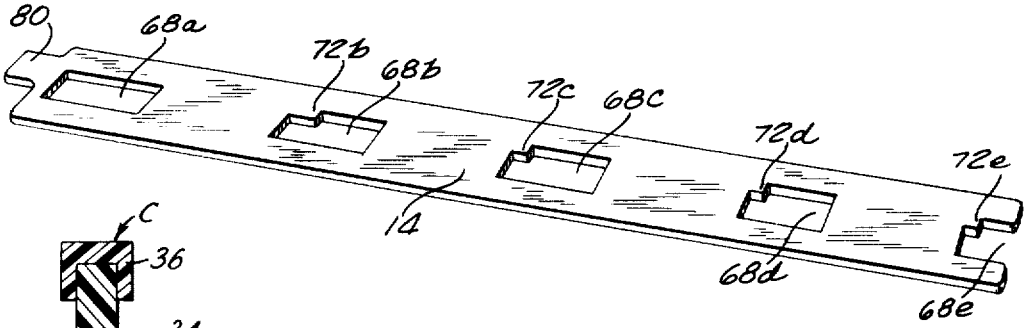
FIG. 3 is a perspective view of the other latch bar.
Figure 8:
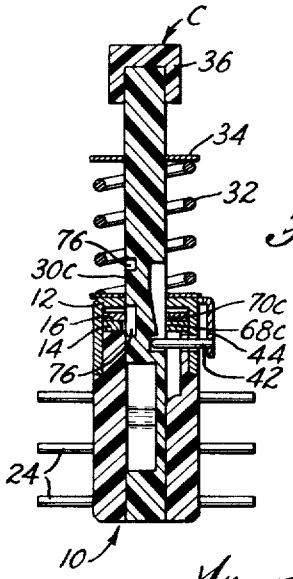
FIG. 8 is a sectional view of switch module C taken along the plane defined by line 8—8 in FIG. 1, showing the interrelationship of cam section 30C and the push-push mechanism 38 on slider bar 26.

FIGS. 2 and 3 show latch bars 16 and 14 respectively. As shown in FIG. 2, latch bar 16 has been rotated endwise 180° from its assembled position shown in FIG. 1. Latch bar 14 has a plurality of apertures 68a, 68b, 68c, 68d and 68e and latch bar 16 has a plurality of apertures 70a, 70b, 70c, 70d and 70e, through which slider bars 26 can pass. Apertures 68b, 68c, 68d and 68e include tongues 72b, 72c, 72d and 72e, respectively, and apertures 70a, 70c, 70d and 70e include tongues 74a, 74c, 74d and 74e, respectively. Aperture 68a of latch bar 14 and aperture 70b of latch bar 16, which are associated with master switch modules A and B, do not have tongues. As shown in FIGS. 1, 4 and 5, the contour of cam sections 30a and 30b on master switch modules A and B are generally in the shape of an inverted Y whereas one side of the cam sections 30c, 30d and 30e on operating switch modules C, D and E are configured with a diverging portion 76 and a notch 78. Tongues 72b, 72c, 72d and 72e of latch bar 14 are adapted to engage the left side of cam sections 30b, 30c, 30d and 30e of modules B, C, D and E, respectively, and tongues 74a, 74c, 74d and 74e of latch bar 16 are adapted to engage the right side of cam sections 30a, 30c, 30d and 30e of modules A, C, D and E, respectively.

As shown in FIG. 1, spring 18 bars against extension 80 of latch bar 14 urging it in the direction of arrow 82 until tongue 72b bears against the left side of cam section 30b and spring 20 bears against extension 84 of latch bar 16 urging it in the direction of arrow 86 with tongue 74a bearing against the right side of cam section 30a. When neither of the master switch modules A and B are actuated, latch bars 14 and 16 are positioned so that the apertures permit the slider bars 26 of the operating switch modules C, D and E to pass therethrough without engaging with cam sections 30c, 30d and 30e and these operating switch modules are operated to the actuated and deactuated position with the push-push action described above.

When the slider bar 26 of master switch module A is depressed as shown in FIG. 4 the converging contour of cam section 30a allows spring 20 to urge latch bar 16 in the direction of arrow 86 until tongue 74a is in contact with the vertical section 88 of cam section 30a. With this transverse movement of latch bar 16, aperture 70c, 70d and 70e are positioned so that tongues 74c, 74d and 74e will engage cam sections 30c, 30d and 30e of operating switch modules C, D and E when the slider bars thereof are depressed. Slider bar 26 of master switch module A is held in the depressed position by a push-push mechanism in the manner described above until being depressed a second time. As a slider bar of one of the operating switch modules, e.g., module C, the tongue associated therewith, e.g., tongue 74c, engages the corresponding cam section, e.g., 30c, rides along the profile of diverging portion 76 thereof and is urged into notch 78 by spring 20 when the slider bar is actuated to the fully depressed position, thereby locking the slider bar into that position. Notch 78 is arranged so that the maximum distance to which slider bar 26 can be depressed is that where pin 42 of the push-push mechanism will not pass position 66 (FIG. 7) i.e., pin 42 is not allowed to move over bevel 52. In this position, spring 32 will return slider bar 26 to the deactuated position, without further depressing of that particular slider bar, when latch bar 16 is moved to the right a sufficient distance to remove tongue 74c from notch 78 and allow cam section 30c to pass through aperture 70c. This right-hand movement of latch bar 16 is effected either by depressing the slider bar of another operating switch module, e.g., module D, so that the diverging portion 76 of the cam section thereof, e.g., 30d engages the associated tongue 74d and forces latch bar 16 to the right against the biasing force of spring 20 or by deactuating master switch module A. Hence, with master switch module A actuated, the operating switch modules C, D and E are interlocked so that in order to release a previously depressed slider bar, the slider bar of another operating switch module must be depressed.

When the slider bar 26 of master switch module B is depressed and master switch module A is in the deactuated position, as shown in FIG. 5, the converging contour of cam section 30b allows spring 18 to urge latch bar 14 in the direction of arrow 82 until tongue 72b is in contact with vertical surface 90 of cam section 30b. With this transverse movement of latch bar 14, aperture 68c, 68d and 68e are positioned so that tongues 72c, 72d and 72e will engage flange 92 of cam sections 30c, 30d and 30e of operating switch modules C, D and E when the slider bars 26 thereof are depressed. The slider bar of master control module B is held in the depressed position by a push-push mechanism in the manner described above until being depressed a second time. Flange 92 is arranged so that the maximum distance to which slider bar 26 can be depressed is that where pin 42 of the push-push mechanism will not pass position 66 (FIG. 7), i.e., pin 42 is not allowed to move out [heel] *bevel* 52. Since pin 42 does not move over bevel 52, thereby preventing backward movement of the slider bar, the slider bar is returned to the deactuated position by spring 32 upon the release of the depressing force. Hence, when master switch module B is actuated, the operating switch modules C, D and E operate with a momentary action.

As illustrated in the drawings, master switch modules A and B are shown with movable contacts which also can perform some switching function if desired. It should be understood that the master switch modules do not have to act as switching meihanisms but can be of any arrangements which includes a cam section coacting with the latch bars to produce the desired movement. Although two separate latch bars and master switches are shown, only one of each is required if only two different actions of the operating modules are desired. For example, if only a push-push and momentary action is desired, only master switch B and latch bar 14 are required.

From the above detailed description of the preferred embodiment it can be seen that a simple inexpensive multistation or ganged modular pushbutton switch assembly having operating switch modules capable of several different types of action is provided. While a preferred embodiment of this invention has been described in detail, it will be obvious to those skilled in the art that the invention may be embodied otherwise without departing from the spirit and scope thereof.

I claim:

1. In a ganged modular pushbutton switch assembly comprising a plurality of changeover switch having at least one pair of fixed contacts mounted in spaced relationship, the improvement comprising:

(a) a reciprocative slider bar disposed in each module carrying at least one contact member for bridging said fixed contacts;

(b) at least two of said switch modules being operating modules having a push-push mechanism means cooperating with said slider bar to control the operation of said switching module;

(c) first cam means located on the slider bars of said operating modules;

(d) a first master control means having a reciprocative slider bar with second cam means thereon; and (e) a first latch bar slidably supported by mounting bracket means, said first latch bar having first cam follower means arranged to cooperate with said first and second cam means so that, when said first master control means is in the deactuated position, said operating modules operate with a push-push action, and when said first master control means is moved to the actuated position, said first latch bar is moved to override said push-push means and to interlock said operating modules so that the slider bar of one operating module must be depressed to return a previously depressed slider bar of another operating module to the deactuated position.

2. The switch assembly according to claim 1 further comprising:

(a) a second master control means having a reciprocative slider bar with a third cam means thereon; and (b) a second latch bar slidably supported by said mounting bracket means, said second latch bar having second cam follower means arranged to cooperate with said first and third cam means so that, when said first and second master control means are in the deactuated position, said operating modules operate with a push-push action, and when said first master control means is deactuated and said second master control means is moved to the actuated position, said second latch bar is moved to a position where said operating modules operate with a momentary action.

3. The switch assembly according to claim 1 wherein said first cam follower means and said first cam means are arranged so that when said first master control means is moved to the actuated position, said second cam means engages the first cam follower means associated therewith and moves said first latch bar laterally to a position where said first cam means cooperate with the first cam follower means associated with the operating modules to interlock said operating modules.

4. The switch assembly according to claim [1] 2 wherein said second cam follower means and said first cam means are arranged so that when said second master control means is moved to the actuated position, said third cam means engages the second cam follower means associated therewith and moves said second latch bar laterally to a position where said first cam means cooperate with the second cam follower means associated with the operating modules to limit the inward movement of the slider bars thereof so that said operating modules operate with a momentary action.

5. The switch assembly according to claim 3 wherein said first latch bar is provided with a plurality of first apertures through which said slider bars project, the first apertures associated with said first master control means and said operating modules being arranged to cooperate with said first and second cam means so as to act as said first cam follower means.

6. The switch assembly according to claim 3 wherein said first master control means comprises a switch module having at least one pair of fixed contacts with the slider bar thereof carrying at least one contact member for bridging these fixed contacts upon actuation.

7. The switch assembly according to claim 4 wherein said *second* latch bar is provided with a plurality of second apertures through which said slider bars project, the second apertures associated with said second master control means and said operating modules being arranged to cooperate with said first and third cam means so as to act as said second cam follower means.

8. The switch assembly according to claim 4 wherein said second master control means comprises a switch module having at least one pair of fixed contacts with the slider bar thereof carrying at least one contact member for bridging these fixed contacts upon actuation.

9. In a ganged modular pushbutton switch assembly including a plurality of changeover switch modules supported in spaced relationship on a mounting bracket means with each module having at least one pair of fixed contacts, the improvement comprising:

(a) a reciprocative slider bar disposed in said module carrying at least one contact member for bridging the fixed contacts upon actuation;

(b) at least two of said switch modules having a push-push mechanism associated therewith and acting as opertaing modules with a controllable slider bar action;

(c) first cam means located on the slider bars of said operating modules;

(d) a master control means having a reciprocative slider bar with a second cam means thereon; and (e) a latch bar slidably supported by said mounting bracket means, said latch bar having cam follower means arranged to cooperate with said first and second cam means so that, when said master control means is in the deactuated position, said operating modules operate with a push-push operation, and when said master control means is moved to the actuated position, said latch bar is moved to a position where said operating modules operate with a momentary action.

10. The switch assembly according to claim 9 wherein said cam follower means and said first cam means are arranged so that, when said master control means is moved to the actuated position, said second cam means engages the cam follower means associated therewith and moves said latch bar laterally to a position where said first cam means cooperate with the cam follower means associated with the operating modules to limit the inward movement of the slider bars thereof so that said operating modules operate with a momentary action.

11. A multimode ganged modular pushbutton switch assembly comprising:

(a) support means;

(b) a plurality of modules affixed to said support means providing control and switch assemblies; said modules comprising:

(i) a housing, (ii) at least a pair of fixed contacts supported in a spaced fixed relationship in said housing, (iii) a pushbutton actuated slider bar [means] slidably supported in said housing for reciprocal movement between actuated and deactuated positions, (iv) contactor means carried by said slider bar for bridging said fixed contacts, and (v) first cam means formed in said slider bar;

(c) first cam follower means supported by said support means and engaging said first cam means whereby said control and switch assemblies operate in a push-push mode;

(d) second cam means formed in the slider bar [means] of said control modules;

(e) third cam means formed in the slider bar [means] of said switch modules; and (f) latch bar means slidably supported by said support means engaging portions of said second and third cam means for alternatively providing a sequential and momentary modes of switch assembly operation.

12. The switch assembly according to claim 11 wherein said plurality of modules includes at least two control assemblies.

13. The switch assembly according to claim 12 wherein said latch bar means comprise:

(a) a first latch bar means biased in a first direction for engaging predetermined portions of said second and third cam means so that, when *a* said control assembly slider bar [means are] *is* in the deactuated position, said switch assemblies operate in the push-push mode and, when one [of] said control slider bar [means] is in the actuated position, said switch assemblies operate in the sequential mode; and (b) a second latch bar means biased in a second direction for engaging predetermined portions of said second and third cam means so that, when *a* said control assembly slider [bars are] *bar is* in the deactuated position, said switch assemblies operate in the push-push mode and, when the other of said control assembly slider bar [means] is in the actuated position, said switch assemblies operate in the momentary mode.

14. The switch assembly *according* to claim 13 wherein said first and second latch bar means are spring biased and said first and second directions are diametrically opposite directions.

References Cited

The following references, cited by the Examiner, are of record in the patented file of this patent or the original patent.

UNITED STATES PATENTS

| | | | |
|---|---|---|---|
| 2,740,004 | 3/1956 | Baldasare | 200—5 EB |
| 2,790,858 | 4/1957 | Tseng et al. | 200—5 E |
| 3,187,602 | 6/1965 | Cousins | 200—5 E X |
| 3,259,699 | 7/1966 | Du Temple<br>De Rougemont et al. | 200—5 E |
| 3,399,282 | 8/1968 | Nagashima et al. | 200—16 D X |
| 3,493,705 | 2/1970 | Noll et al. | 200—159 R |

FOREIGN PATENTS

| | | | |
|---|---|---|---|
| 1,259,014 | 3/1961 | France | 200—153 J |
| 2,002,298 | 10/1969 | France | 200—159 R |

JAMES R. SCOTT, Primary Examiner

U.S. Cl. X.R.

200—153 J; 74—483 RB

UNITED STATES PATENT OFFICE

CERTIFICATE OF CORRECTION

Patent No. Re.27,836 Dated December 11, 1973

Inventor(s) Eric George Hansen

It is certified that error appears in the above-identified patent and that said Letters Patent are hereby corrected as shown below:

| | |
|---|---|
| Column 2, lines 21 and 22, | The word "switch" is repeated, one of which should be deleted |
| Column 4, line 11, | "bars" should be ---bears--- |
| Column 5, line 7, | "out" should be ---over--- |
| Column 5, line 18, | "meihanisms" should be ---mechanisms--- |
| Column 5, line 37, (Claim 1) | after "switch" insert ---modules--- |

Signed and sealed this 2nd day of July 1974.

(SEAL)
Attest:

EDWARD M.FLETCHER,JR.
Attesting Officer

C. MARSHALL DANN
Commissioner of Patents